United States Patent
Beall

(10) Patent No.: US 9,856,987 B2
(45) Date of Patent: Jan. 2, 2018

(54) DISTRIBUTION VALVE

(71) Applicant: Topper Manufacturing Corporation, Redondo Beach, CA (US)

(72) Inventor: Timothy Allen Beall, Redondo Beach, CA (US)

(73) Assignee: Topper Manufacturing Corporation, Torrance, CA (US)

( * ) Notice: Subject to any disclaimer, the term of this patent is extended or adjusted under 35 U.S.C. 154(b) by 0 days.

(21) Appl. No.: 14/957,852

(22) Filed: Dec. 3, 2015

(65) Prior Publication Data
US 2017/0159833 A1   Jun. 8, 2017

(51) Int. Cl.
*F16K 11/072*   (2006.01)
*F16K 31/60*    (2006.01)
*F16K 31/44*    (2006.01)

(52) U.S. Cl.
CPC ......... *F16K 11/072* (2013.01); *F16K 31/44* (2013.01); *Y10T 137/86549* (2015.04)

(58) Field of Classification Search
CPC ........ F16K 11/02; F16K 11/072; F16K 3/246; F16K 31/60; Y10T 137/86549; B01D 61/08; B01D 61/10
USPC ........................................................ 251/229
See application file for complete search history.

(56) References Cited

U.S. PATENT DOCUMENTS

| | | | | |
|---|---|---|---|---|
| 2,499,318 A * | 2/1950 | Jungerhans | ............ | F15B 13/06 137/625.23 |
| 2,547,254 A * | 4/1951 | Braithwaite | ............ | F15B 13/06 137/625.17 |
| 2,630,325 A * | 3/1953 | Reynolds | ............ | C02F 1/42 137/625.17 |
| 3,269,412 A * | 8/1966 | Badke | ............ | F16K 11/078 137/625.17 |
| 3,874,413 A * | 4/1975 | Valdez | ............ | F16K 11/072 137/625.47 |
| 4,115,276 A * | 9/1978 | Kelly | ............ | B01D 29/668 137/625.29 |
| 4,580,602 A * | 4/1986 | Boody | ............ | F16K 11/078 137/625.17 |
| 4,744,895 A * | 5/1988 | Gales | ............ | B01D 61/08 210/257.2 |

(Continued)

FOREIGN PATENT DOCUMENTS

| | | | | |
|---|---|---|---|---|
| DE | 29800463 U1 * | 3/1998 | ............ | F16K 11/072 |
| JP | 3635417 B2 * | 4/2005 | | |
| WO | WO 2009022433 A1 * | 2/2009 | ............ | B01D 61/10 |

OTHER PUBLICATIONS

"International Search Report and Written Opinion of the International Searching Authority dated Feb. 2, 2017; International Application No. PCT/US2016/064032", (Feb. 2, 2017).

*Primary Examiner* — Seth W MacKay-Smith
(74) *Attorney, Agent, or Firm* — Blakely Sokoloff Taylor & Zafman LLP

(57) ABSTRACT

A dispensing valve for fastening to a water faucet disposed over a drain and to a reverse osmosis water filtering unit for controllably dispensing tap water, for providing feed water to the reverse osmosis water filtering unit, for providing squeeze water to the reverse osmosis water filtering unit and dispensing product water received therefrom, and to block all water flow. The dispensing valve may also dispense tap water in a spray, and provide for waste water disposal.

22 Claims, 9 Drawing Sheets

(56) References Cited

U.S. PATENT DOCUMENTS

| | | | |
|---|---|---|---|
| 4,794,843 A * | 1/1989 | Poling | F15B 13/04 |
| | | | 137/625.17 |
| 4,997,553 A | 3/1991 | Clack | |
| 5,078,864 A | 1/1992 | Whittier | |
| 5,194,156 A | 3/1993 | Tomchak | |
| 6,110,360 A * | 8/2000 | Hart, Jr. | B01D 61/08 |
| | | | 210/110 |
| 7,506,664 B2 * | 3/2009 | Norris | B60H 1/00485 |
| | | | 137/625.17 |
| 7,601,256 B2 | 10/2009 | Beall | |
| 2007/0045165 A1 | 3/2007 | Beall | |
| 2014/0053931 A1 * | 2/2014 | Whitaker | F16K 11/0853 |
| | | | 137/625.17 |
| 2015/0107691 A1 * | 4/2015 | Lallemant | F02B 29/0418 |
| | | | 137/340 |

* cited by examiner

DISTRIBUTION VALVE

BACKGROUND OF THE INVENTION

1. Field of the Invention

The present invention relates to the field of reverse osmosis filters and dispensing valves therefor.

2. Prior Art

Reverse osmosis water filters (hereafter simply water filters) are well known in the prior art. For consumer use, such water filters generally fall into two forms, specifically, above counter water filters and under counter or under sink water filters (hereafter under the counter water filters).

The prior art above counter water filters generally have a tap water connection to the water faucet on the sink for providing tap water thereto at water line pressure, and a drain running to the sink for disposal of waste water. The accumulation of product water in such water filters is in an unpressurized container, normally part of the above counter water filter, with a dispenser formed as part of the overall assembly for dispensing product water.

The prior art under the counter water filters are normally of the type including a product water container with a diaphragm therein for receiving product water as it is produced, and a control valve that includes the capability of providing squeeze water, that is water at the water line pressure, to the outer wall of the diaphragm to pressurize product water for dispensing purposes. It is this pressurized dispensing which is most convenient for under counter usage, though as an alternative, one could use an electric pump for pressurizing the product water for dispensing, though such an arrangement becomes rather complex to prevent overflow of product water, etc. Also, in some homes, particularly in developing countries, there may not be electric power available under the counter or under the sink.

Recently, a reverse osmosis water filter has been developed which is suitable for use in both above the counter and under the counter installations. Such versatile water filters are disclosed in U.S. Pat. No. 7,601,256. The advantage of such water filters is that the same water filter may initially be used in an above the counter installation as a trial usage, and when later desired, the same unit may be placed under the counter as a more permanent and out of the way placement. Therefore, in that regard, initial placement under the counter is obviously possible, though such placement becomes a rather permanent placement in the sense that it would require special connections to the water system (pressurized tap water and drain) as well as the creation of a hole in the counter for the above counter dispensing valve. Accordingly, such permanent installation is particularly unattractive to water filter users that want to evaluate a water filter before such permanent installation.

BRIEF DESCRIPTION OF THE DRAWINGS

FIG. 8 is a cross section of a distribution valve taken along the axis of the valve assembly illustrating the distribution valve with all flow passages closed or blocked so that no water flows even if the faucet itself is on.

DETAILED DESCRIPTION OF THE PREFERRED EMBODIMENTS

The present invention comprises a dispensing valve for selectively coupling tap water to at least one faucet outlet, to a reverse osmosis water filter, to a reverse osmosis water filter and to receive product water therefrom, and to shut off all tap water flow. Also, in a preferred embodiment disclosed herein, the dispensing valve includes a spray output selection, and further provides a waste water connection to the water filter.

Figure 1:
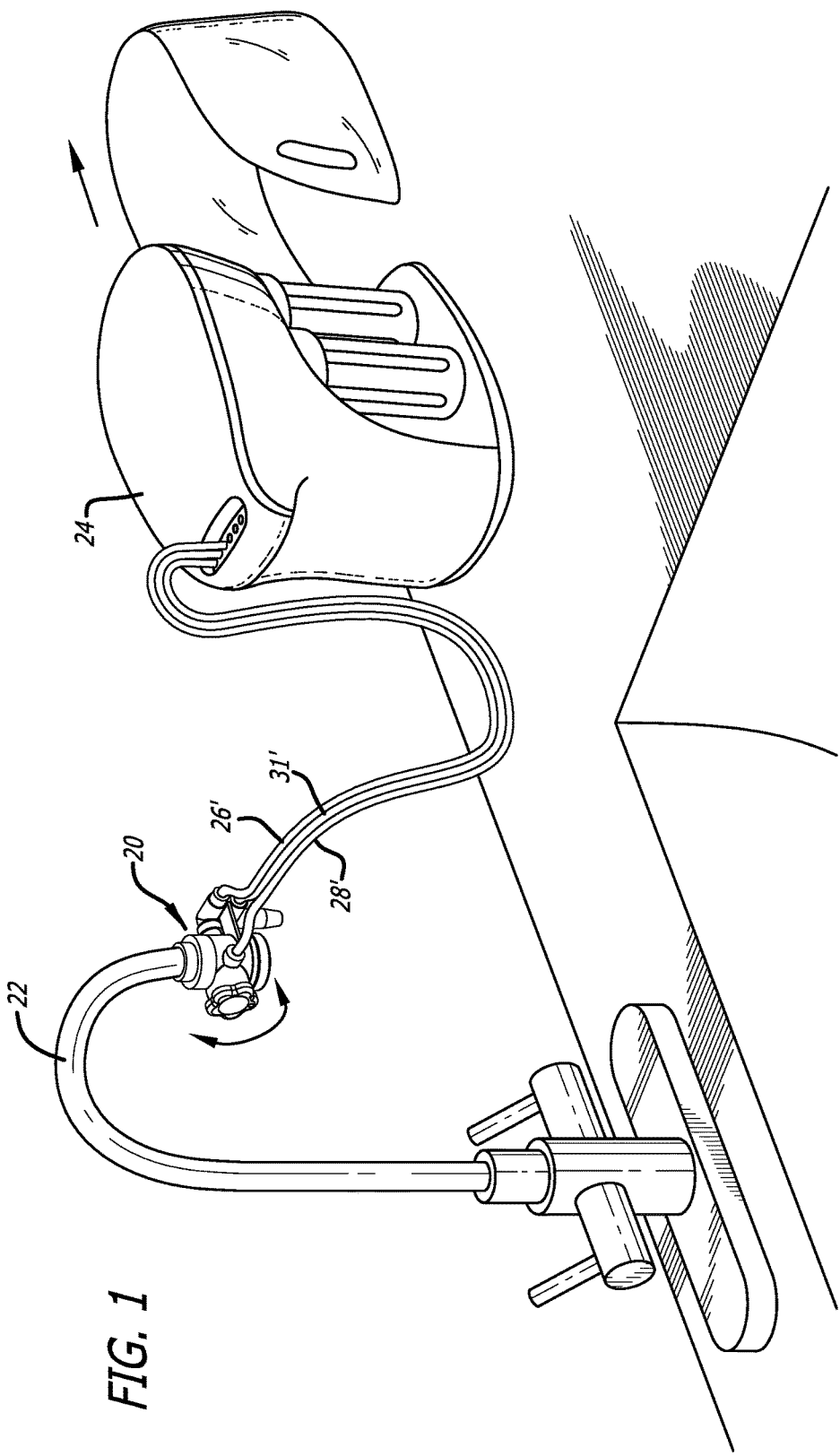
FIG. 1 is a view of a typical installation incorporating a distribution valve in accordance with the present invention.
Figure 2:
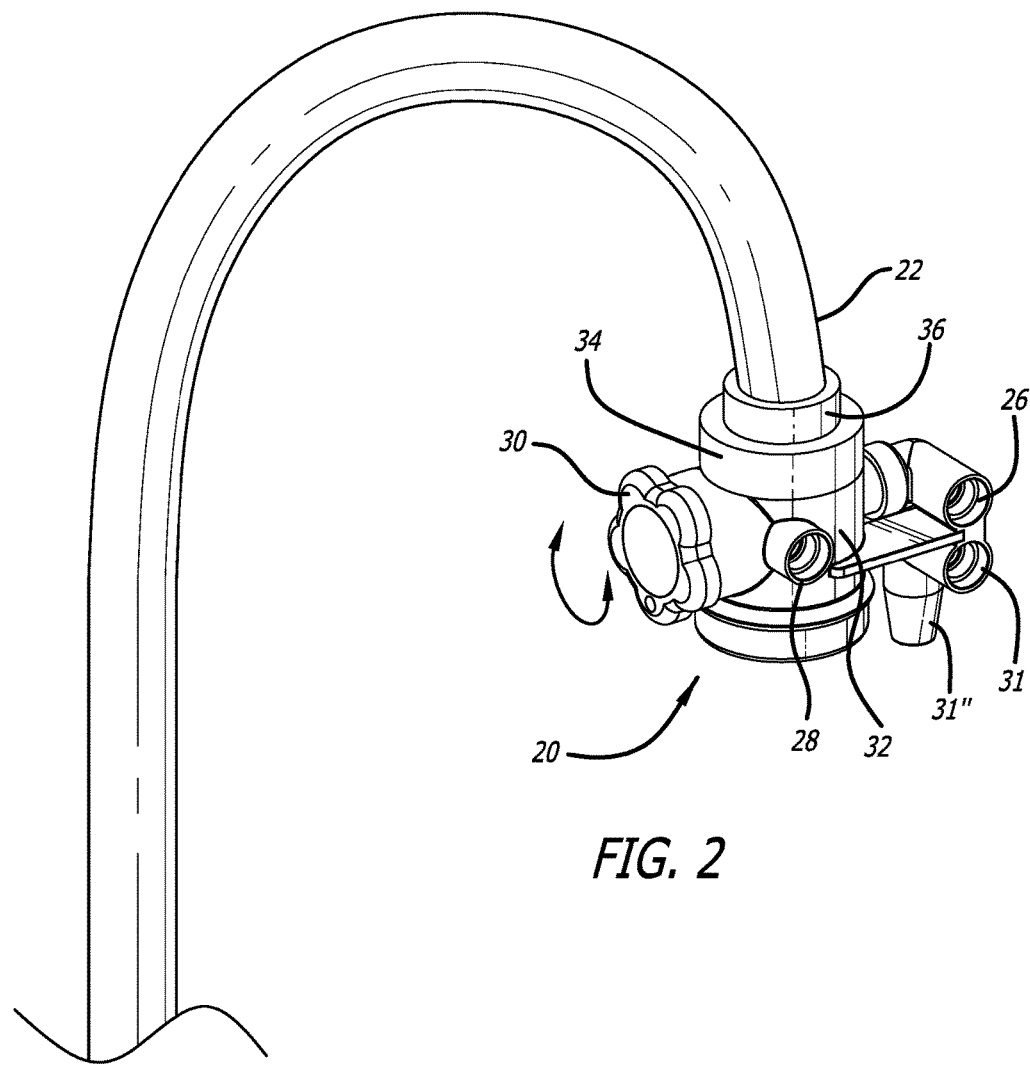
FIG. 2 is a view of the distribution valve of FIG. 1 taken on an expanded scale.

The dispensing valve is intended to be mounted on a faucet outlet over a sink, such as a kitchen sink. Accordingly, an embodiment of the invention is illustrated in FIG. 1 wherein the dispensing valve, generally indicated by the numeral 20, is shown screwed onto the end of a faucet outlet 22. A reverse osmosis water filter 24 may be coupled to the dispensing valve 20 through feed water connection 26 (FIG. 2) and water line 26' to provide feed water to the water filter 24, and product water from the water filter 24 to the distribution valve 20 through line 28' and product water connection 28 (FIG. 2). In the specific embodiment shown in FIG. 1, a third water line 31' is provided for disposal of waste water through waste water connection 31 forming a fourth connection which simply drains through the third outlet or drain port 31", though waste water could be disposed of in some alternate fashion, such as by way of example, through a line simply emptying into the sink. In one embodiment, the lines 26' and 28', and line 31' if used, are in a single extruded strip split at the ends as required for attachment at the ends thereof as shown, though of course if desired, individual lines can be used.

Now referring to FIG. 2, the distribution valve 20 is shown on an expanded scale. The distribution valve 20 is controlled by rotatable handle 30, which as shall be subsequently described, is rotatable in 45 degree increments through 180°, with a stop at each end of the 180°, to be described.

FIG. 2 also well illustrates the manner of connection of the distribution valve to the faucet outlet 22. In particular, faucets such as faucet 22 have a threaded outer end with a member typically containing a screen threaded thereto. To install the distribution valve 20 of the present invention, the member on the end of the faucet outlet 22 is removed. The top of the distribution valve body 32' forming the first connection is threaded (See FIG. 3A) to receive a clamp member 34, which in turn captures a lower flanged end of flanged member 36 tightly screwed onto the faucet outlet 22 so that once the flange on flanged member 36 is captured by the clamp member, the distribution valve may be angularly oriented with respect to the faucet outlet 22 as desired, and clamp member 34 tightened to clamp valve body 32 of distribution valve 20 to the faucet outlet 22 at the desired angle with respect thereto.

Figure 3A:
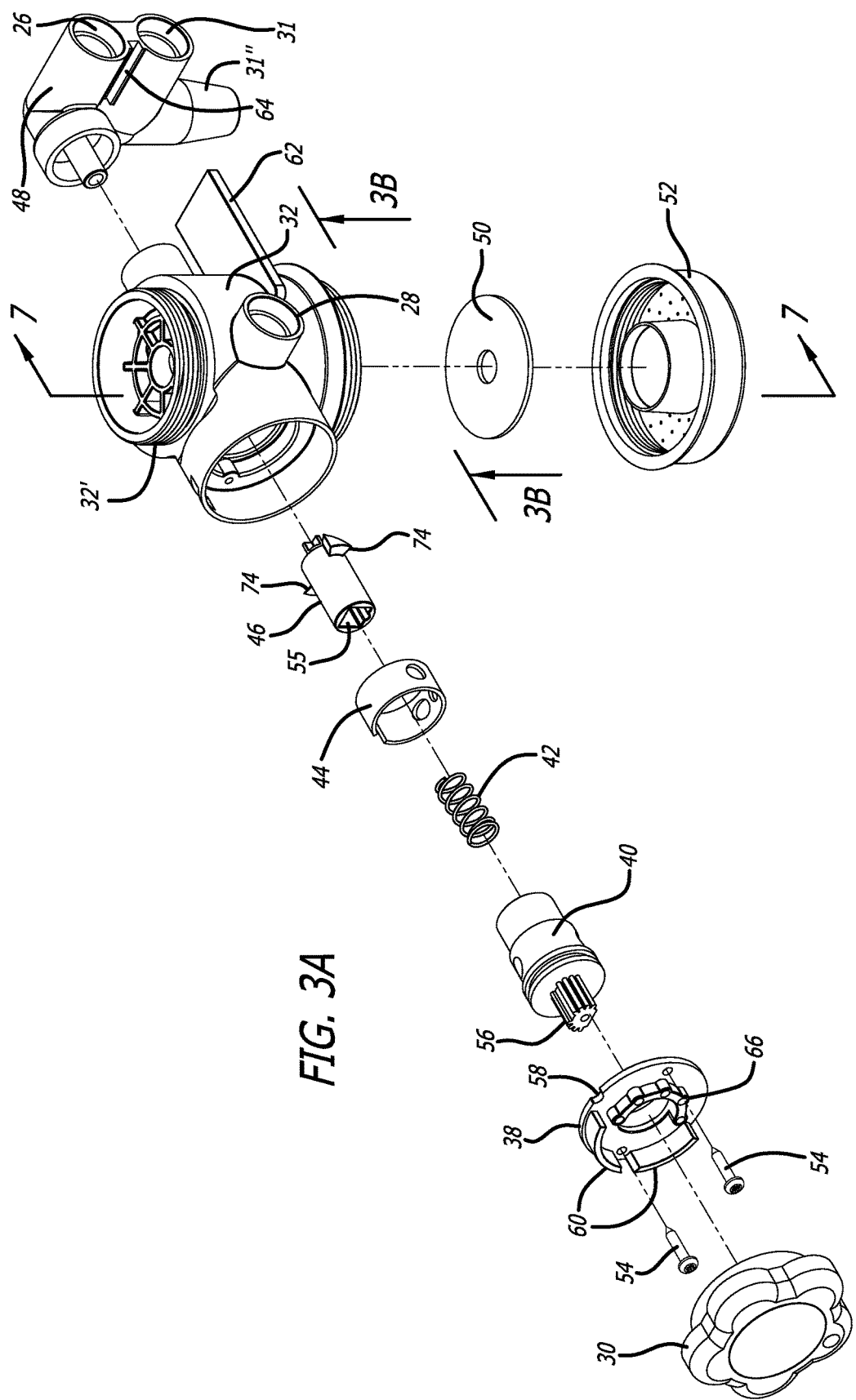
FIG. 3A is an exploded view of the distribution valve of FIGS. 1 and 2.

Now referring to FIG. 3A, an exploded view of the distribution valve 20 of FIGS. 1 and 2 may be seen. In addition to distribution valve body 32 and handle 30, also shown in the Fig. is a retaining ring 38 which is screwed to valve body 32 by screws 54, a rotary valve member 40, a spring 42, a valve seal 44, and an axial valve member 46, as well as a manifold 48, a closing plate 50 and a sprinkler head 52. Rotary valve member 40, spring 42 and axial valve member 46 form the valve member assembly of a preferred embodiment of the invention. Also shown in the Fig. are the various water ports 26, 28 and 31. In the overall assembly, the valve seal locates within valve body 32 to align with ports therein and to not rotate with the rotation of the assembly connected to handle 30. The spring 42 fits within the rotary valve member 40, within which is a drive post for fitting within the opening 55 in the axial valve member 46, with the spring 42 normally holding the axial valve member 46 against an internal port in valve body 32.

It will be noted that the otherwise square opening 55 in the axial valve member 46 has a longitudinal depression on one face of that opening, with the drive post in rotary valve member 40 having a complementary longitudinal protrusion so that the rotary valve member 40 and the axial valve member 46 can only be assembled in a single relative angular orientation. Similarly, the handle 30 is angularly oriented with respect to the rotary valve member 40 because of the unsymmetrical shape of the protrusion 56 on the rotary valve member 40 and a complementary recess in the handle 30, not visible in FIG. 3A. Further, the retaining ring 38 has a depression 58 on its periphery, with valve body 32 having a corresponding protrusion therein so that the retaining ring 38 will also only assemble with respect to the body in a fixed angular orientation. In addition, protrusions 60 fit within a cooperative angular recess in the back of the handle 30, with the recess having a local protrusion therein, which together with the protrusions 60, define the stops for the 180° rotational limit of the handle 30 in the final distribution valve 20 of FIGS. 1 and 2. Of course to complete the assembly of this embodiment, manifold 48 fits within a cooperate opening on the corresponding side of valve body 32, with projection 62 fitting within slot 64 of the manifold to automatically provide the desired angular orientation of the manifold 48 with respect to valve body 32. Alternatively, a manifold like manifold 48 might be made adjustable with respect to the valve body 32 to allow its positioning so that waste water flow falls directly into the drain without a splash and any growth of mineral deposits on the sink surface. Finally, the sprinkler head 52 screws onto the bottom of valve body 32 with a closing plate 50 trapped there between. Finally, the retaining ring 38 includes a circular segment having five equally distributed depressions 66 distributed around 180°, with a tab (not shown) on the back side of handle 30 to provide a detent on each of the five operating positions of the handle 30.

Figure 8:
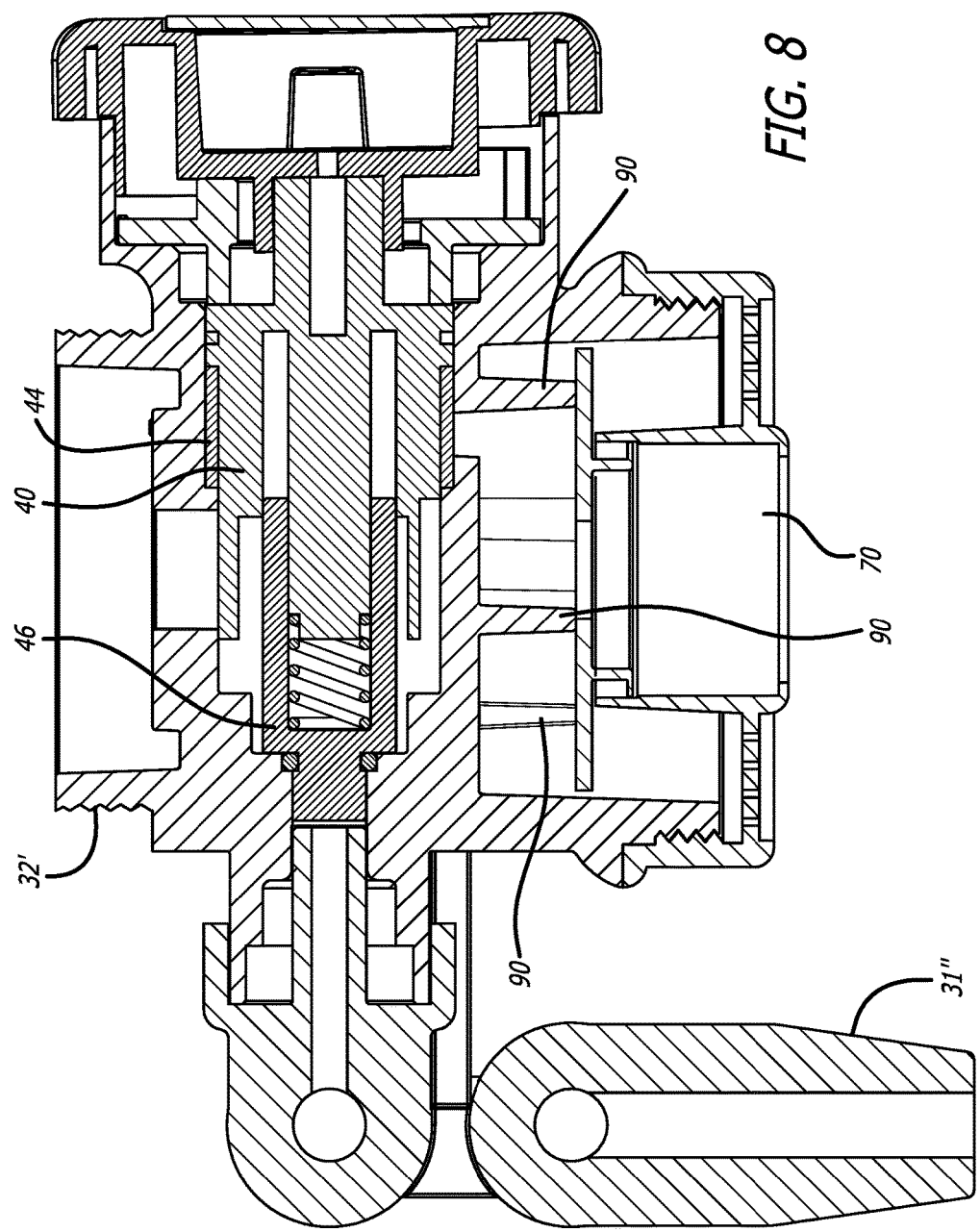

It will be noted in FIG. 3A that the right end of axial valve member 46 is cross shaped, not solid. This provides centering of the axial valve member in a complementary cylindrical flow path, and at the same time, allows water flow past that cross shaped region unless the flow path is otherwise blocked. This is particularly important with respect to FIG. 6, as shall be subsequently described in detail, though is not relevant to FIGS. 4, 5 and 8. Accordingly, certain artistic liberties have been taken in FIGS. 4, 5 and 8 with respect to the illustration of this region of the axial valve member 46.

Figure 3B:
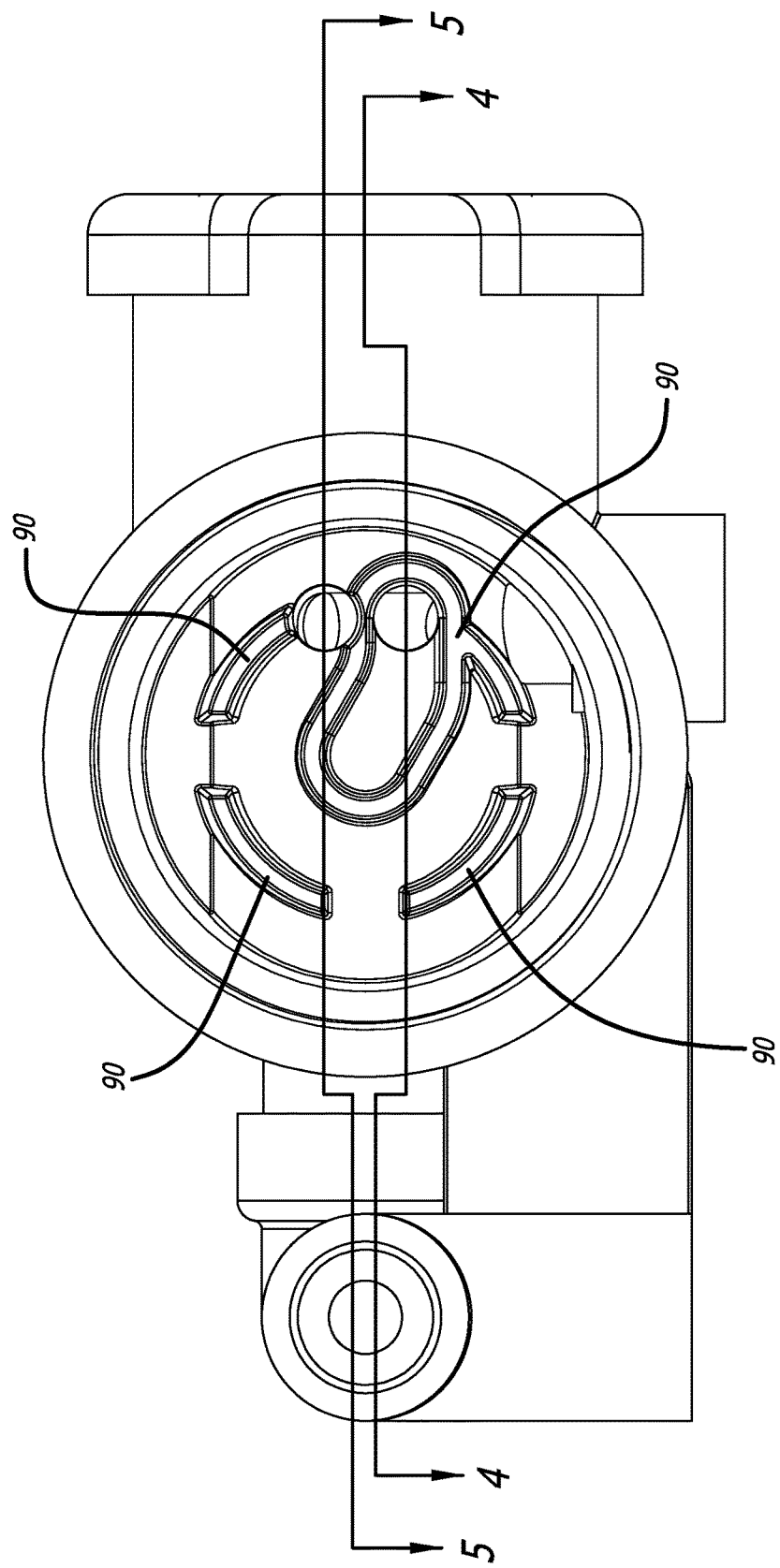
FIG. 3B is a bottom view of the distribution valve body.

FIG. 3B is a view looking upward (direction 3B in FIG. 3A) into the lower end of valve body 32 of FIG. 3A. The various flow paths hereafter described are in part defined by downward projecting protrusions 90 as may be seen in FIGS. 4-6 and 8. In the Figs. explained below, it is assumed that the cold water faucet is turned on at all times, though obviously the faucet may be turned off to stop all water flow, which can itself be useful, as it allows the distribution valve to be left in a single position, such as the product water dispensing position, which product water dispensing can be controlled by control of the faucet, rather than the handle 30.

Figure 4:
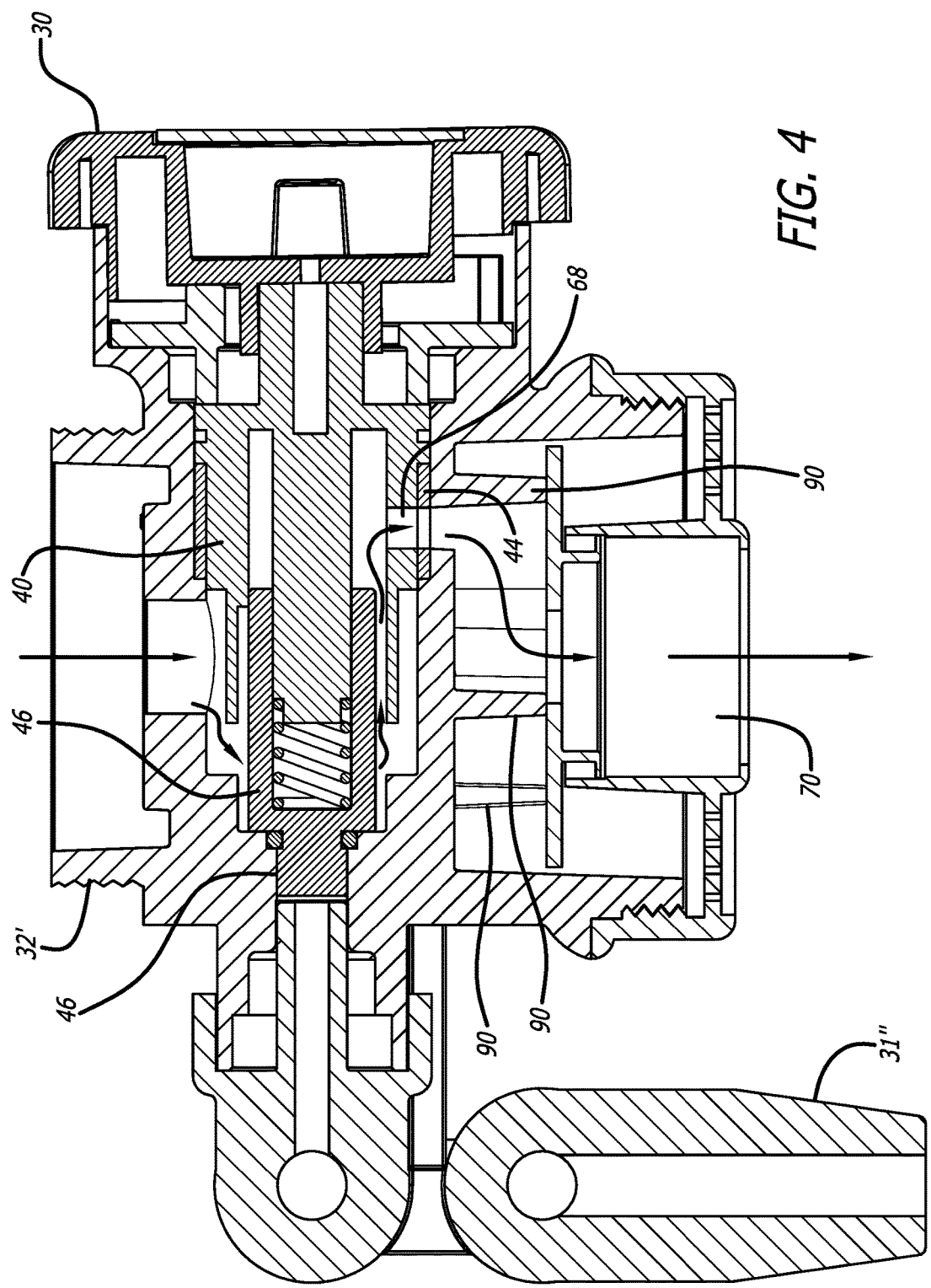
FIG. 4 is a cross section of a distribution valve taken along line 4-4 of FIG. 3A, illustrating the distribution valve in a normal tap water dispensing condition.
Figure 5:
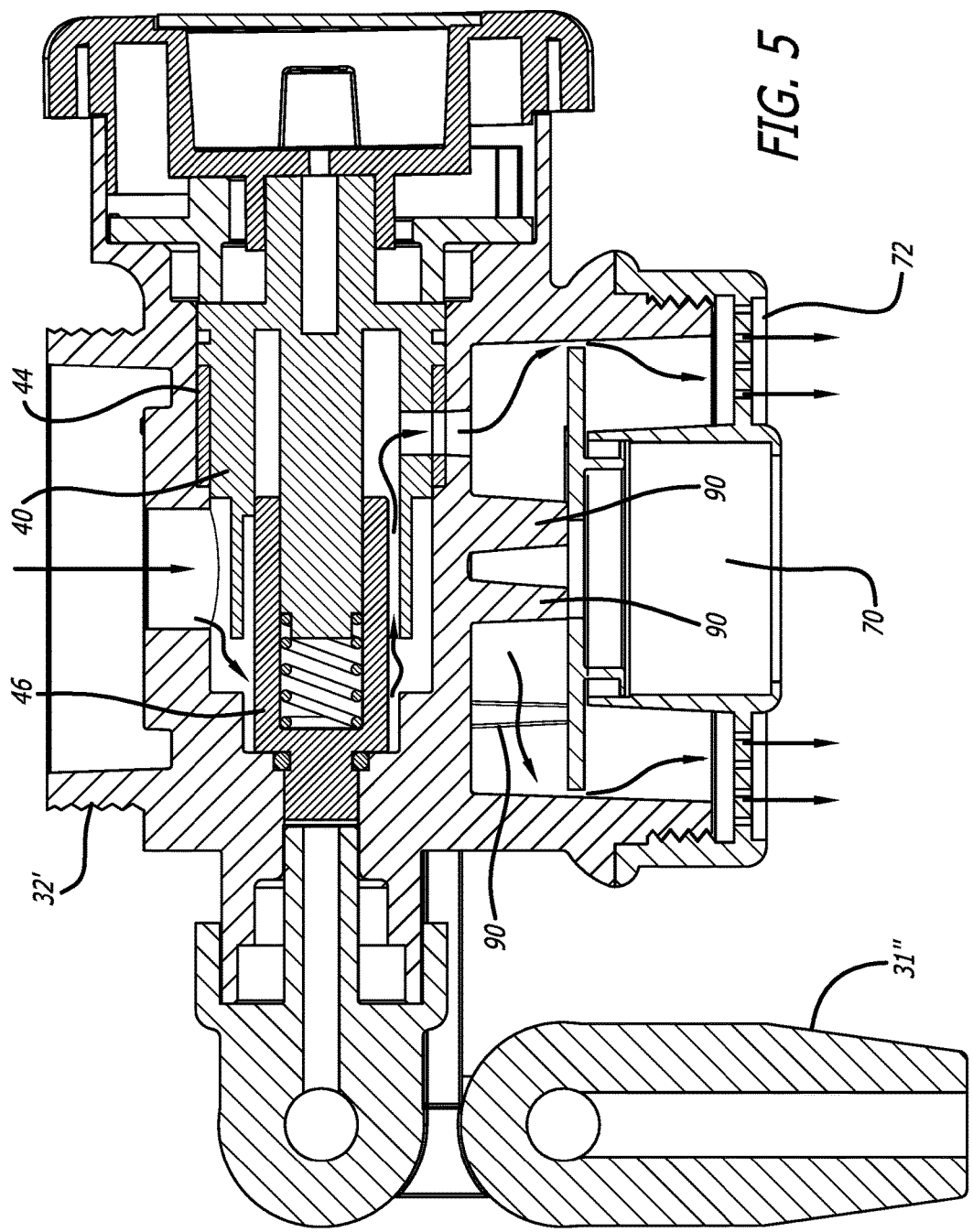
FIG. 5 is a cross section of a distribution valve taken along line 5-5 of FIG. 3A, illustrating the distribution valve in a tap water spray dispensing condition.

Now referring to FIG. 4, a cross section of the dispensing valve 20 taken through the axis of handle 30, rotary valve member 40 and axial valve member 46 may be seen. In this angular orientation of rotary valve member 40, opening 68 in the spool is aligned with a corresponding opening in the valve seal 44 so as to provide fluid communication between the inlet to valve body 32 along the flow path indicated by the arrows to dispense tap water through first outlet 70 in a conventional stream. In FIG. 5, the handle has been rotated 45 degrees from the position shown in FIG. 4. In this position, faucet water is directed to a second outlet or spray outlet 72 as illustrated, the spray preferably being concentric with first outlet 70, but separate from the first outlet.

Figure 6:
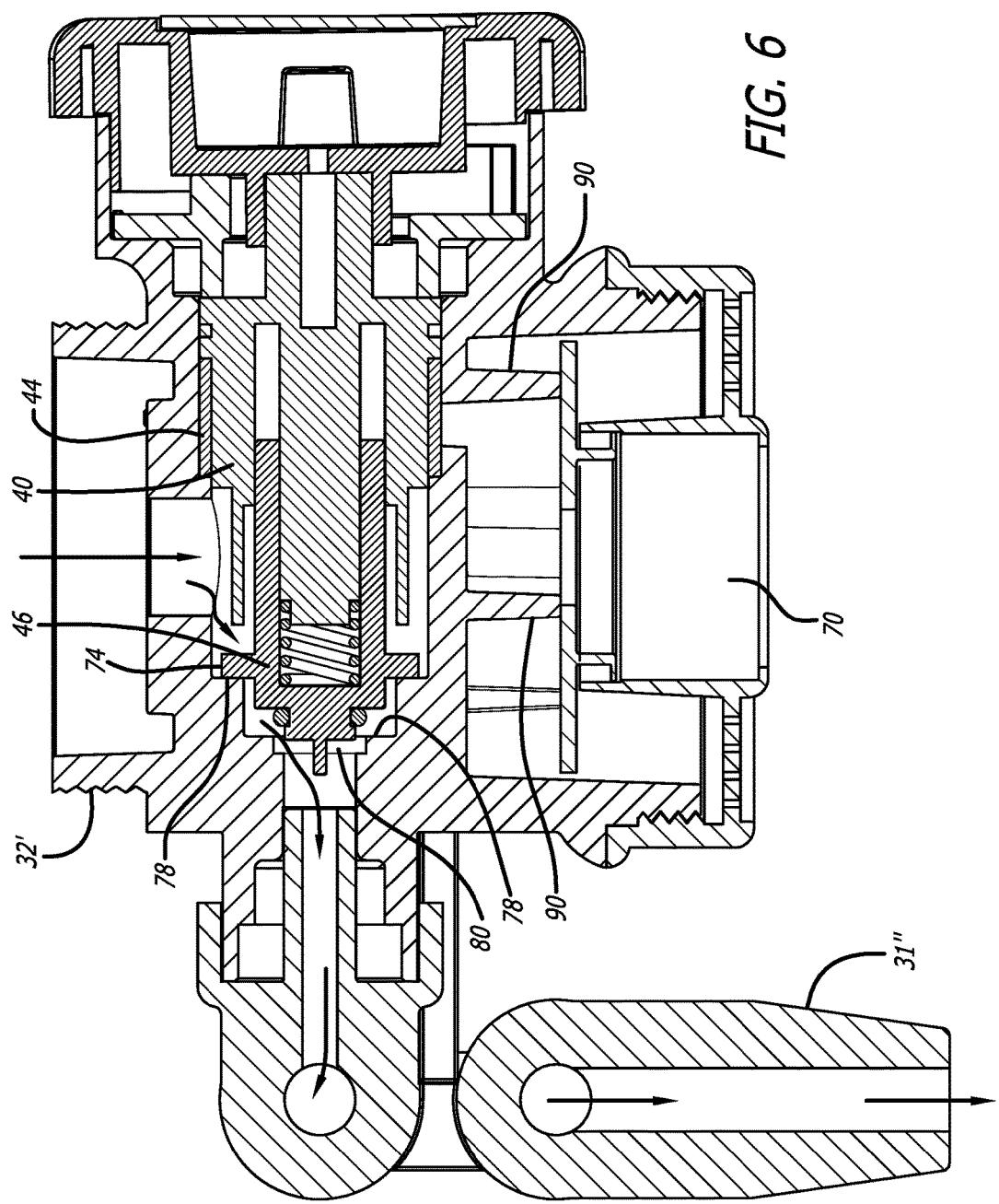
FIG. 6 is a cross section of a distribution valve taken along the axis of the valve assembly, illustrating the distribution valve in a position to provide feed water to a reverse osmosis filtering unit.

FIG. 6 illustrates dispensing valve 20 after handle 30 has been rotated a further 45 degrees. In this angular orientation of rotary valve member 40, cam followers 74 engage cam surfaces 78 on adjacent walls of valve body 32 to force axial valve member 46 to further deflect spring 42 to provide a water flow passage through port 80 to water port 26 forming a second connection (FIGS. 2 and 3) as illustrated, port 80 being coaxial with and at the end of the axial valve member port 80 being coaxial with and at the end of the axial valve member. This provides feed water to reverse osmosis water filter 24 for producing product water, with waste water returned to the sink as previously described. As illustrated in FIG. 6, so as to not obscure the function of the cross shaped end of the axial valve member 46, the local cross section of the cross shaped member is taken through a plane slightly below the plane of the main cross section illustrated in FIG. 6, as the cross section of that region in the plane of the rest of the cross section of FIG. 6 appears as a solid region.

Figure 7:
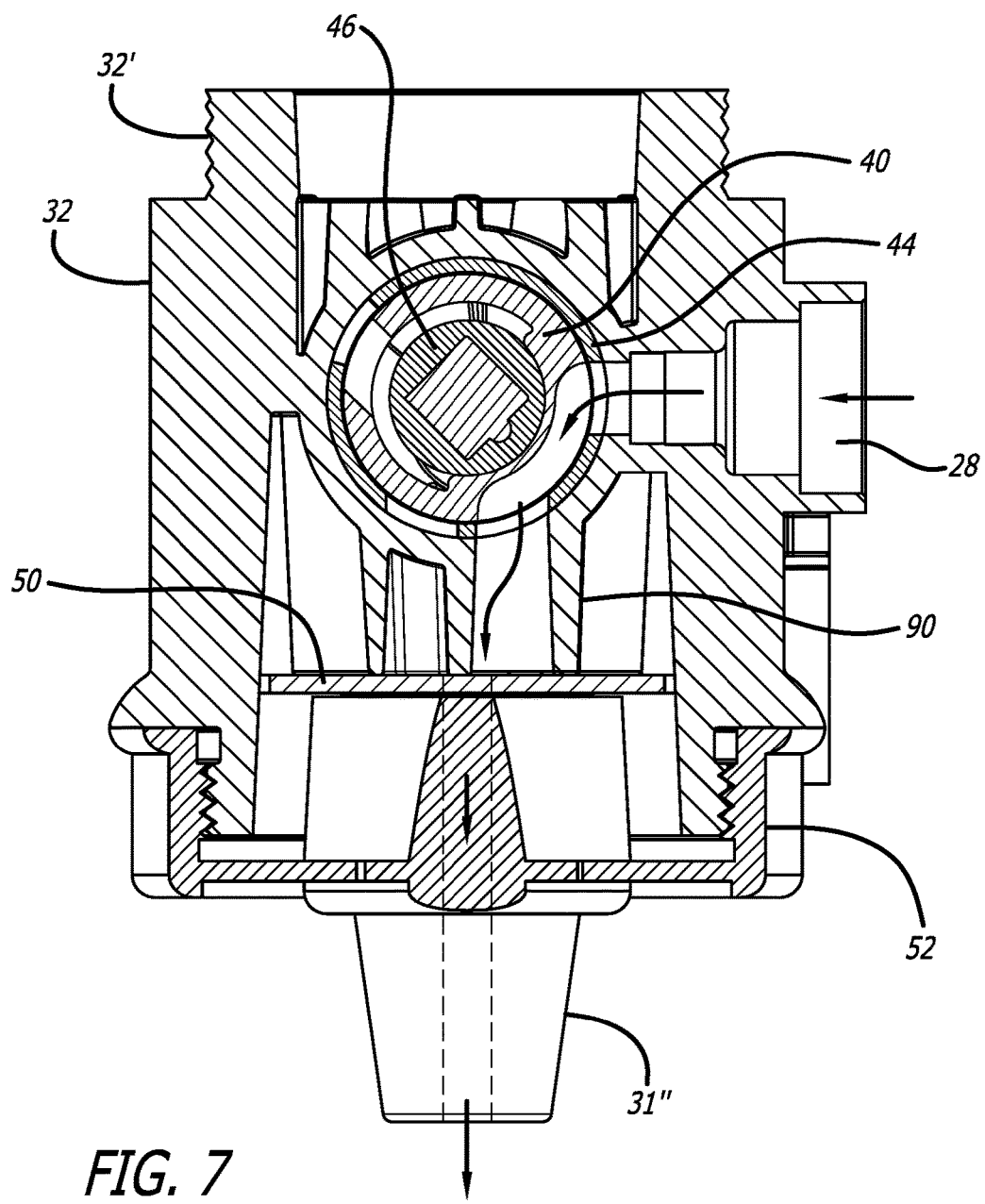
FIG. 7 is a cross section of a distribution valve taken along line 7-7 of FIG. 3A illustrating the distribution valve in a position to provide feed water to a reverse osmosis unit and to dispense product water from the reverse osmosis unit.

FIG. 7 is a cross section of the dispensing valve 20 of FIG. 1 effectively taken along line 7-7 of an assembly of the part illustrated in FIG. 3A and illustrates the further rotation of handle 30 through another 45 degrees to the product water dispensing position. Note that this cross section is not centered on the vertical axis of the valve body 32. In this position, the feed water is left on as illustrated in FIG. 6 to provide what is now squeeze water for squeezing the diaphragm in the product water accumulator of reverse osmosis water filter 24 to provide product water dispensing pressure, and at the same time, pressurized product water itself is provided to dispensing valve 20 through a third connection 28 to be dispensed through outlet 70. Finally in FIG. 8, all flow passages are closed or blocked so that no water flows even if the faucet itself is on. As an alternative, the cam surface in valve body 32 may range in angular extent to maintain the axial valve member 46 in the position illustrated in FIG. 6, even in this "off" position of FIG. 8, as that would continue the production of product water in reverse osmosis water filter 24 until the product accumulator is full of product water, after which reverse osmosis water filter 24 will shut itself off (block feed water flow).

What is claimed is:

1. A valve for fastening to a water faucet disposed over a drain comprising:

a valve body having a first connection adjacent the top thereof for connecting to a faucet;

the valve body having a second connection for connecting to a reverse osmosis unit to provide faucet water from the valve to a reverse osmosis unit;

the valve body having a third connection for receiving product water from a reverse osmosis unit;

the valve body having a first outlet adjacent the bottom thereof for allowing a stream of water there through;

the valve body having a valve member assembly therein for coupling the first connection to the first outlet adjacent the bottom of the valve body when in a first position, for coupling the first connection to the second connection when in a second position, for coupling the first connection to the second connection and for coupling the third connection to the first outlet when in a third position, and for blocking water flow through the first and second connections when in a fourth position;

the valve body having a second outlet adjacent the bottom thereof, the second outlet providing a spray of water when coupled to the first connection, the valve member assembly in the valve body having a fifth position for coupling the first connection to the second outlet when in a fifth position;

the valve body having a fourth connection for coupling to a waste water outlet on a reverse osmosis water filter and a third outlet adjacent the first and second outlets, the fourth connection and the third outlet being in fluid communication and not controllable by the valve member assembly.

2. The valve of claim 1 wherein the position of the valve member assembly within the valve body is controlled by a manual control accessible from a side of the valve body.

3. The valve of claim 2 wherein the manual control is rotatable about an axis thereof.

4. The valve of claim 3 wherein the axis of the manual control is substantially horizontal when the valve is mounted on a faucet.

5. The valve of claim 3 wherein the manual control is rotatable in either direction through the first, second, third and fourth positions.

6. A valve for fastening to a water faucet disposed over a drain comprising:

a valve body having a first connection adjacent the top thereof for connecting to a faucet;

the valve body having a second connection for connecting to a reverse osmosis unit to provide faucet water from the valve to a reverse osmosis unit;

the valve body having a third connection for receiving product water from a reverse osmosis unit;

the valve body having a first outlet adjacent the bottom thereof for allowing a stream of water there through;

the valve body having a valve member assembly therein for coupling the first connection to the first outlet adjacent the bottom of the valve body when in a first position, for coupling the first connection to the second connection when in a second position, for coupling the first connection to the second connection and for coupling the third connection to the first outlet when in a third position, and for blocking water flow through the first and second connections when in a fourth position;

wherein the position of the valve member assembly within the valve body is controlled by a manual control accessible from a side of the valve body and rotatable about an axis thereof; and wherein the valve member assembly comprises a rotary valve member and an axial valve member coaxial with the rotary valve member and with a spring there between, which valve member assembly in cooperation with the valve body forms a combination rotary valve and axial valve.

7. The valve of claim 6 wherein the valve member assembly is rotatable with respect to the valve body about an axis of the valve member assembly to selectively align with openings for coupling the first connection to the first outlet adjacent the bottom of the valve body when in the first position, for coupling the first connection to the second connection when in the second position, for coupling the first connection to the second connection and for coupling the third connection to the first outlet when in the third position, and for blocking water flow through the first and second connections when in the fourth position, the third connection being coupled to a port coaxial with and at an end of the valve member assembly, the axial valve member being axially translatable and held in a position to block flow through the port by the spring, the valve body further having at least one cam surface and the axial valve member having at least one cam follower surface, the cam surface and cam follower surface engaging when the valve member assembly approaches the third position to move the axial valve member axially against the force of the spring to open the flow through the port to dispense product water.

8. The valve of claim 7 wherein the valve body further comprises a second outlet adjacent the bottom thereof, the second outlet providing a spray of water when coupled to the first connection, the valve member assembly in the valve body having a fifth position for coupling the first connection to the second outlet when in a fifth position.

9. The valve of claim 8 wherein the valve member is manually adjustable in either direction through an order of the first, second, third and fourth positions.

10. The valve of claim 8 wherein the valve body further comprises a second outlet adjacent the bottom thereof and concentric with the first outlet, the second outlet providing a spray of water when coupled to the first connection, the valve member in the valve body having a fifth position for coupling the first connection to the second outlet when in a fifth position.

11. The valve of claim 10 wherein the valve member is manually adjustable in either direction through an order of the first, fifth, second, third and fourth positions.

12. The valve of claim 10 wherein the valve body further comprises a fourth connection for coupling to a waste water outlet on a reverse osmosis water filter and a third outlet adjacent the first and second outlets, the fourth connection and the third outlet being in fluid communication and not controllable by the valve.

13. The valve of claim 8 wherein the position of the valve member within the valve body is controlled by a manual control assessable from a side of the valve body.

14. The valve of claim 13 wherein the manual control is rotatable about an axis thereof.

15. The valve of claim 8 wherein the valve member assembly is manually adjustable in either direction through an order of the first, fifth, second, third and fourth positions.

16. The valve of claim 7 wherein the valve body further comprises a fourth connection for coupling to a waste water outlet on a reverse osmosis water filter and a third outlet adjacent the first and second outlets, the fourth connection and the third outlet being in fluid communication.

17. A valve for fastening to a water faucet disposed over a drain comprising:

a valve body having a first connection adjacent the top thereof for connecting to a faucet;

the valve body having a second connection for connecting to a reverse osmosis unit to provide faucet water from the valve to a reverse osmosis unit;

the valve body having a third connection for receiving product water from a reverse osmosis unit;

the valve body having a first outlet adjacent the bottom thereof for allowing a stream of water there through;

a valve member assembly having a rotary valve member and an axial valve member coaxial therewith and rotatable in unison with the rotary valve member with a spring there between, which valve member assembly in cooperation with the valve body forms a combination rotary valve and axial valve, the rotary valve member being rotatable with respect to the valve body about an axis of the valve member to selectively align with openings in the valve body for coupling the first connection to the first outlet adjacent the bottom of the valve body when in the first position, for coupling the first connection to the second connection when in the second position, for coupling the first connection to the second connection and for coupling the third connection to the first outlet when in the third position, and for blocking water flow through the first and second connections when in the fourth position, the third connection being coupled to a port coaxial with and at an end of the axial valve member, the axial valve member being axially translatable with respect to the rotary valve member and held in a position to block flow through the port by the spring, the valve body further having at least one cam surface and the axial valve member having at least one cam follower surface, the cam surface and cam follower surface engaging when the valve member approaches the third position to move the axial valve member axially against the force of the spring to open the flow through the port to dispense product water.

18. The valve of claim 14 wherein the axis of the manual control is substantially horizontal when the valve is mounted on a faucet.

19. The valve of claim 14 wherein the manual control is rotatable in either direction through the first, second, third and fourth positions.

20. The valve of claim 14 wherein the valve member in cooperation with the valve body forms a combination rotary valve and axial valve.

21. The valve of claim 20 wherein the valve body further comprises a second outlet adjacent the bottom thereof, the second outlet providing a spray of water when coupled to the first connection, the valve member in the valve body having a fifth position for coupling the first connection to the second outlet when in a fifth position.

22. The valve of claim 21 wherein the valve member is manually adjustable in either direction through an order of the first, fifth, second, third and fourth positions.

* * * * *